Aug. 10, 1926.
M. G. GRUNDMANN
ARTICLE HOLDER
Original Filed June 29 1925     3 Sheets-Sheet 1
1,595,513
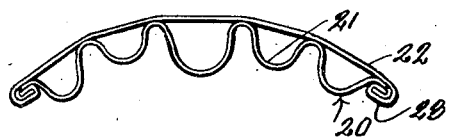
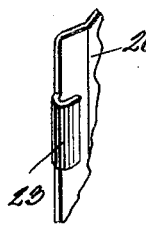
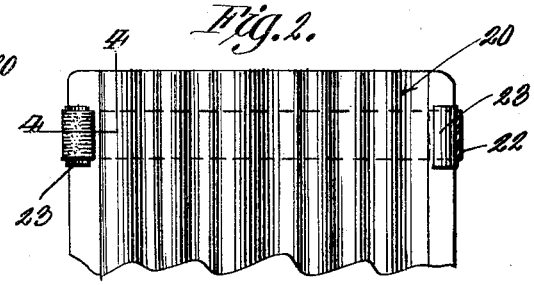
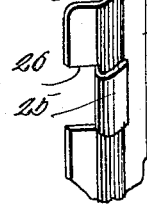
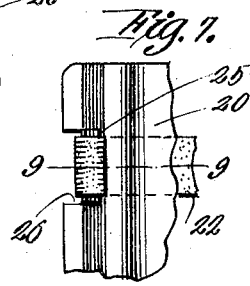
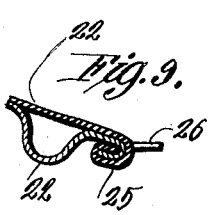
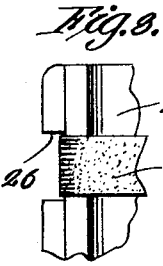
Inventor
MICHAEL G. GRUNDMANN
WITNESSES
By Richard B. Owen, Attorney

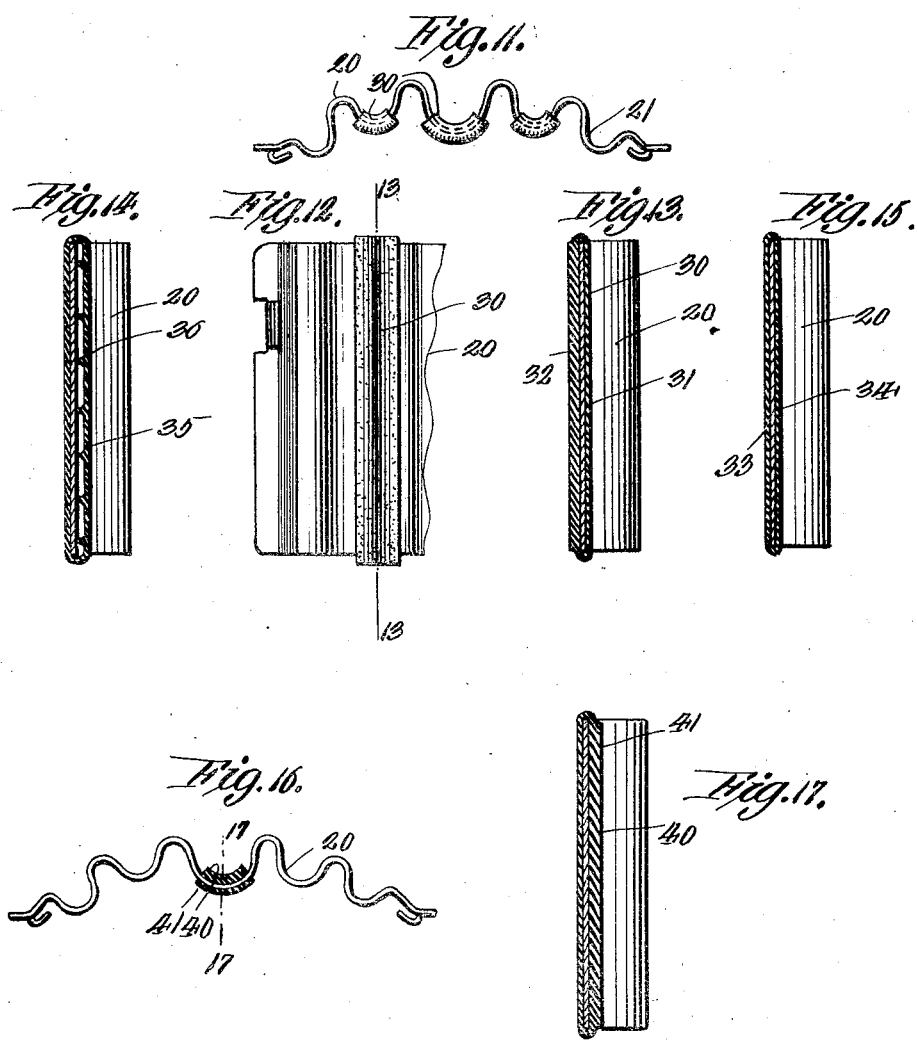

Aug. 10, 1926.
M. G. GRUNDMANN
ARTICLE HOLDER
Original Filed June 29 1925   3 Sheets-Sheet 3
1,595,513
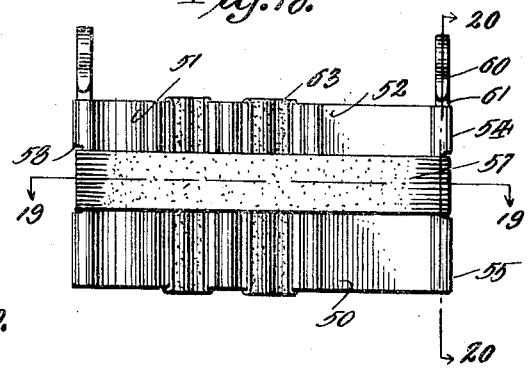
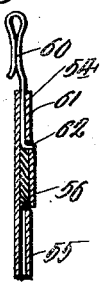
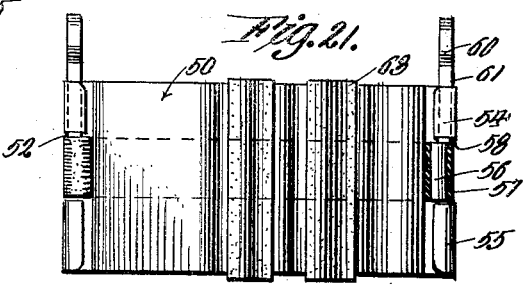
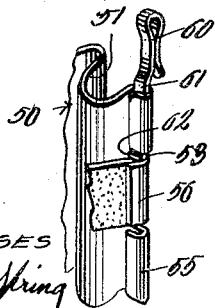
WITNESSES
Inventor
MICHAEL G. GRUNDMANN
By Richard B. Owen
Attorney Patented Aug. 10, 1926.

1,595,513

UNITED STATES PATENT OFFICE.

MICHAEL G. GRUNDMANN, OF FARIBAULT, MINNESOTA.

ARTICLE HOLDER.

Continuation of application Serial No. 40,461, filed June 29, 1925. This application filed August 26, 1925. Serial No. 52,694.

This invention appertains to the means for holding articles, such as pens, pencils and the like in the pocket against loss and is a continuation of my application Serial No. 40,461, filed June 29, 1925.

The primary object of the present invention is to provide novel means for anchoring the terminals of the elastic retaining band in place on the pocket plate, whereby the said bands can be readily placed in position at a small cost and positively held against accidental displacement.

Another object of the invention is the provision of novel pads carried by the pocket plate for preventing the contacting of the articles held in the pocket against contact with the said pocket plate, said means also forming a friction face for engaging the articles being held to prevent the accidental displacement thereof.

A further object of the invention is the provision of novel means carried by the body plate for engaging the pocket, so as to prevent loss of the body plate from the pocket.

A still further object of the invention is to provide novel means for associating the pocket engaging means with the body plate, whereby said means will be positively held against movement.

A further object of the invention is to generally simplify article holders of the type shown in the mentioned application and for effecting the purpose intended in a more facile way.

With these and other objects in view, the invention consists in the novel construction, arrangement and formation of parts, as will be hereinafter more specifically described, claimed, and illustrated in the accompanying drawings, in which drawings:

Figure 1 is a plan view of the article holder illustrating the novel means employed for retaining the elastic holding band in place on the body or pocket plate, Figure 2 is a fragmentary rear elevation of the device, illustrating the improved means of connecting the elastic band in place, Figure 3 is a detail fragmentary perspective view of one end of the body plate showing the bent back tongue for receiving one terminal of the elastic band, Figure 4 is a detail horizontal section taken on the line 4—4 of Figure 2 showing the band clamped in place, Figure 5 is a detail perspective view of the band, Figure 6 is a top plan view of the body plate showing a modified form of means for connecting the band in place, Figure 7 is a fragmentary rear elevation of the same, Figure 8 is a fragmentary front elevation of the same,

Figure 9 is a detail horizontal section taken on the line 9—9 of Figure 7 illustrating the modified means of clamping the band in place, Figure 10 is a fragmentary perspective view of one end of the body plate illustrating the modified form of tongue for engaging one terminal of the band, Figure 11 is a top plan view of the body plate illustrating the novel means carried thereby for engaging the articles to be held in the pocket, Figure 12 is a fragmentary rear elevation of the body plate showing the means for engaging one of the articles to be held,

Figure 13 is a vertical section through the body plate of said means taken on the line 13—13 of Figure 12, Figure 14 is a vertical section taken on the same line as Figure 13 illustrating a modified form of means for engaging one of the articles to be held, Figure 15 is a similar view illustrating a further modified form of means for engaging one of the articles to be held,

Figure 16 is a top plan view of the body or pocket plate showing a still further modified form of means for engaging one of the articles to be held, said means being shown in horizontal section,

Figure 17 is a vertical section taken on the line 17—17 of Figure 16,

Figure 18 is a front elevation of a further modified form of the article holder showing the novel means carried thereby for engaging the pocket of the wearer, Figure 19 is a horizontal section through the same taken on the line 19—19 of Figure 18 illustrating a modified form of means for holding the articles being held against displacement, Figure 20 is a vertical section taken on the line 20—20 of Figure 18 looking in the direction of the arrows, Figure 21 is a rear elevation of the modified form of article holder, Figure 22 is a detail perspective view of one end of the article holder, Figure 23 is a horizontal section illustrating a modified form of means for holding the articles in place on the body plate.

Referring to the drawings in detail, wherein similar reference characters designate corresponding parts throughout the several views, the numeral 20 indicates the pocket or body plate, which is of substantially the same construction as my pending application heretobefore referred to. This plate is made from sheet metal or the like and is of arcuate configuration when viewed in plan and is corrugated or otherwise formed to provide a plurality of spaced vertically extending pockets or cells 21. These pockets or cells 21 can be of varying sizes to receive different sizes of pencils, pens, and the like. The articles placed in the said pockets or cells 21 are held against displacement therein by the use of a suitable elastic band, strap or the like 22 and Figures 1 to 4 inclusive illustrate the novel means of holding the band in position. This band extends transversely across the outer face of the plate as clearly shown in Figures 1 and 2 of the drawings. The side edges of the plate 20 are provided with laterally extending lugs or tongues 23 which are bent back over the rear face of the plate. In accordance with this invention, the terminals of the elastic band or strap 22 are brought around back over the said lugs or tongues 23 and the extreme ends of the band are placed between the terminals of the lugs or tongues 23 and the rear face of the said plate after which the lugs or tongues 23 are bent back so as to effectively clamp the terminals of the band. It is obvious from this construction that the front face of the plate is left entirely free from any obstructions and that an efficient means has been provided for holding the band 22 in place.

In Figures 6 to 8 inclusive I have shown a modified form of holding the band 22 in place. In this form of the invention, tongues or lugs 25 are struck from the side edges of the plate 20 which defines notches 26 which are adapted to receive the terminals of the band. The upper and lower walls of the notches 26 prevent movement of the band over the face of the plate as is obvious from an inspection of the drawing. These lugs or tongues 25 are bent back over the rear face of the plate and the terminals of the elastic band are brought over the said tongues or lugs 25 and the extreme ends thereof are placed between the lugs or tongues and the rear face of the plate. After which the tongues are bent back so as to firmly clamp the band or strap in place.

In some instances, it might be preferable to provide means for spacing the articles being held from the walls of the pockets or cells 21 and form means for frictionally engaging the articles being held throughout the entire height of the body plate 20 and to accomplish this purpose I provide an endless band 30 which is preferably formed from rubber and the bands 30 are of substantially the same width as the cells or pockets 21. As shown in Figure 13 of the drawings I have provided an endless band 31 which extends vertically around the body plate so as to engage the rear wall of the pocket or cell and the portion of the endless band which engages the pocket or cell is appreciably thickened as indicated by the reference character 32 for forming means for engaging the article being held and the thickened portion 32 forms a seat similar to a cushioning pad.

In Figure 15 of the drawings the opposite runs 33 and 34 of the band are of the same thickness.

In Figure 14 I purposely provide the inner face of one run 35 with a plurality of transversely extending lugs or tits 36 which engage the inner face of the pockets or cells. This also provides an efficient cushioning means.

In Figure 17 I have shown a form of band indicated by the reference character 40 which is similar to the band 31 in that one run 41 thereof is increased in thickness. However in this instance the run 41 is placed on the opposite side of the pocket from that shown in Figure 13.

From the foregoing description, it can be seen that I have provided a novel means for holding the elastic retaining band for the articles in place and novel means for frictionally engaging the articles being held throughout the entire height of the body plate.

In Figures 18 to 23 inclusive I have shown a still further modified form of the invention. In this form I provide a body plate 50 which can be of a less height than the body plates shown in the forms previously described. The body plate 50 is also corrugated to provide a plurality of vertically extending cells 51 of various sizes and a flat relatively wide cell 52 for the reception of a ruler or the like.

The side edge of the body plate 50 is provided at a point intermediate its ends, with a pair of spaced parallel inwardly extending slots 53 which define upper and lower tongues 54 and 55 and an intermediate tongue 56. In order to hold the articles in the various cells an elastic band 57 is provided and this band extends across the front face of the plate the terminals of the elastic band are brought rearwardly over the tongues 56 after which the tongues are bent back into gripping engagement with the rear face of the plate for effectively holding the band in place. The tongues 54 and 55 can also be bent in engagement with the rear face of the plate in order to eliminate all sharp edges and the like. The tongues 56 are bent back a greater distance than the tongues 54 and 55 which define stop shoulders 58 for preventing sliding movement and displacement of the band 57. If desired an endless band 59 can be employed in lieu of the band 57 and in this form the band extends entirely about the plate and is confined by the shoulders 58.

In this form of the invention I also provide means for positively holding the plate 50 in place and this means embodies novel spring clips 60 which are adapted to be sprung over the goods forming the pocket. Each of the clips 60 embody shanks 61 which are held in place by the upper tongues 54 which are clamped about the same. The extreme lower ends of the shanks 61 are provided with angularly extending feet 62 which are disposed in the slots 53 between the tongues 54 and 56. This prevents movement of the clips up or down within the tongues 54.

Suitable elastic friction bands 63 can be passed about the plate 50 transversely thereof so as to provide friction means for engaging the pocket as well as the articles being held. If, it is found that the articles are too small to fit snugly within the pockets, suitable reducing means can be employed, such as strips of cardboard or the like for taking up the remainder of the space.

Changes in details may be made without departing from the spirit or the scope of this invention, but—

What I claim as new is:

1. A pocket article holder comprising a single body plate corrugated to provide a plurality of spaced vertical cells for receiving the articles, an elastic band extending across the plate having the terminals thereof brought back over the sides of the plate, and rearwardly bent tongues for engaging the terminals of the band for clamping the same between the rear wall of the plate and said tongues.

2. A pocket holder comprising a single body plate corrugated to provide a plurality of spaced vertical cells for receiving the articles to be held, an elastic band extending across the plate and having its terminals brought around the side edges of the plate over the rear face thereof, laterally extending retaining tongues formed on the side edges of the plate for receiving said terminals of the band, the tongues forming means for clamping the terminals of the band therebetween in the rear face of the plate.

3. A pocket article holder comprising a single body plate corrugated to privide a plurality of spaced vertical cells for receiving the articles to be held, tongues struck out from the side edges of the body plate bent back upon the rear face thereof, the struck out tongues defining notches in the side edges of the body plate, an elastic band extending across the plate having its terminals brought through the notches and over the bent back tongues, the tongues forming means for clamping the extreme ends of the bands therebetween in the rear face of the plate.

4. A pocket article holder comprising a single body plate corrugated to provide a plurality of spaced vertically extending cells and endless elastic bands extending vertically about the plates having a portion thereof arranged in said cells.

5. A pocket article holder comprising a single body portion corrugated to provide a pair of spaced vertically extending cells, upper, lower and intermediate tongues formed on the side edges of the plate bent back in engagement with the rear face of the plate, the intermediate tongues bent back a greater distance than the upper and lower tongues to define stop shoulders, a retaining band extending longitudinally across the plate held against sliding movement by said shoulders, and pocket engaging clips extending above the plate and held in place by the uppermost tongues.

6. A pocket article holder comprising a single body plate corrugated to provide a plurality of spaced vertically extending cells for receiving the articles, an elastic band extending across the plate having the terminals thereof brought back over the sides of the plate, rearwardly bent tongues for engaging the terminals of the band for clamping the same between the rear face of the plate and said tongues, similar upper and lower tongues formed on the plate bent in rear of the plate, pocket engaging clamps confined in place by the uppermost tongues, and angularly extending feet formed on the lower ends of the clamps arranged between and confined in place by the upper tongues and the band engaging tongues.

7. A pocket article holder comprising a single body plate corrugated to provide a plurality of spaced vertical cells, for receiving the articles to be held, the side edges of the body being provided with a pair of spaced parallel inwardly directed slots defining upper, lower and intermediate tongues, the intermediate tongues being bent back rearwardly in engagement with the rear face of the plate, the upper and lower tongues being bent back in engagement with the rear face of the plate a less distance than intermediate the tongues defining stop shoulders, a retaining band for the articles in the cells confined between said shoulders, pocket engaging clamps each including an elongated shank confined in place between the uppermost tongue and the plate, and angularly extending feet formed on the lower terminals of the shanks arranged in the uppermost slot of the pair of slots between the upper tongues and said intermediate tongues.

In testimony whereof I affix my signature.

MICHAEL G. GRUNDMANN.